Feb. 1, 1944.    F. P. KRUSE    2,340,477
TAP AND DIE HOLDER
Filed April 1, 1940    2 Sheets-Sheet 1
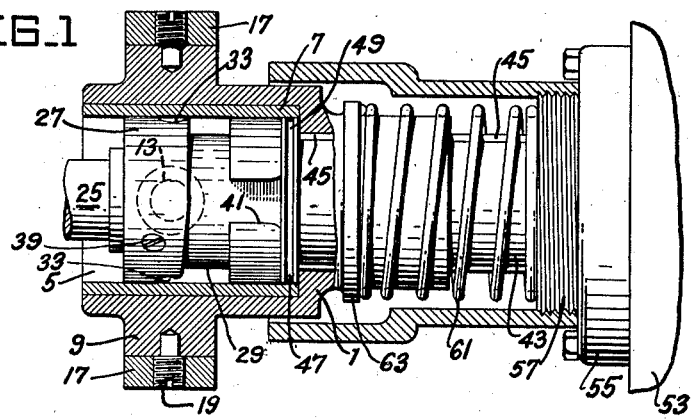
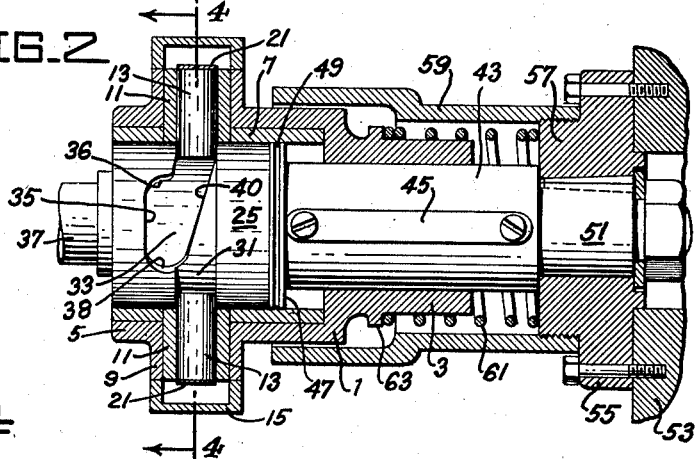
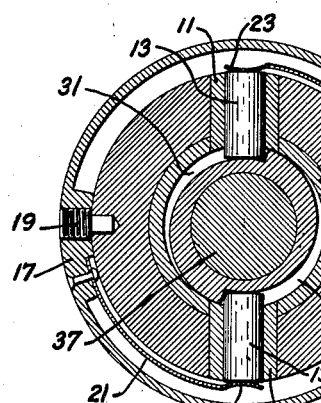
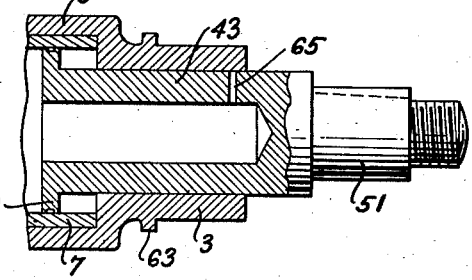
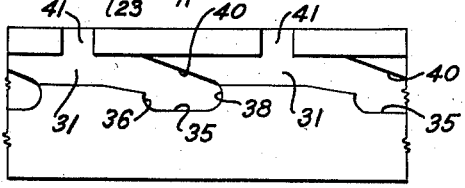
INVENTOR.
FREDERICK P. KRUSE
BY Charles O. Bruce
HIS ATTORNEY.

Patented Feb. 1, 1944

2,340,477

UNITED STATES PATENT OFFICE 2,340,477

TAP AND DIE HOLDER

Frederick P. Kruse, Berkeley, Calif.

Application April 1, 1940, Serial No. 327,200

12 Claims. (Cl. 10—89)

My invention relates to a tap and die holder, and more particularly to a tap and die holder for use in any and all metal turning lathes, drilling machines, and tapping machines equipped with either reversible horizontal or vertical spindles.

It is an object of my invention to provide an improved tap and die holder which shall be substantially free from shock during use; to provide an improved tap and die holder, capable of smooth operation; to provide an improved tap and die holder, capable of repeated accuracy, irrespective of the tapping speed or size of opening to be tapped; to provide an improved tap and die holder, capable of high speed operation and adapted to handle a wide range of tap sizes; to provide an improved tap and die holder, adapted for quick change-over to accommodate different ranges of tap sizes; to provide an improved tap and die holder, capable of threading shallow openings, requiring but a minimum number of threads; to provide an improved tap and die holder, capable of rapid separation of the tool from the work, following an operation thereon; to provide an improved tap and die holder, adaptable for operation with right or left-hand threaded taps; to provide an improved tap and die holder of rugged construction and which is substantially vibrationless in operation; and to provide an improved tap and die holder which is simple in construction and subject to little wear in use, and which requires no preliminary training or experience in the operation thereof.

Additional objects of my invention will be brought out in the following description of the same taken in conjunction with the accompanying drawings wherein—

Figure 1 is a view, partly in section, of my improved tap and die holder.

Figure 2 is a view of the improved tap and die holder of Figure 1, rotated through 90 degrees, and showing additional parts thereof in section.

Figure 3 is a sectional view through a portion of the construction of Figure 2, taken through the axis thereof in the plane of the drawings.

Figure 4 is a view, in section, taken along the line 4—4 of Figure 2.

Figure 5 is a lay-out view of the cam surfaces of the cam element constituting an important component of my improved tap and die holder.

Figure 6:
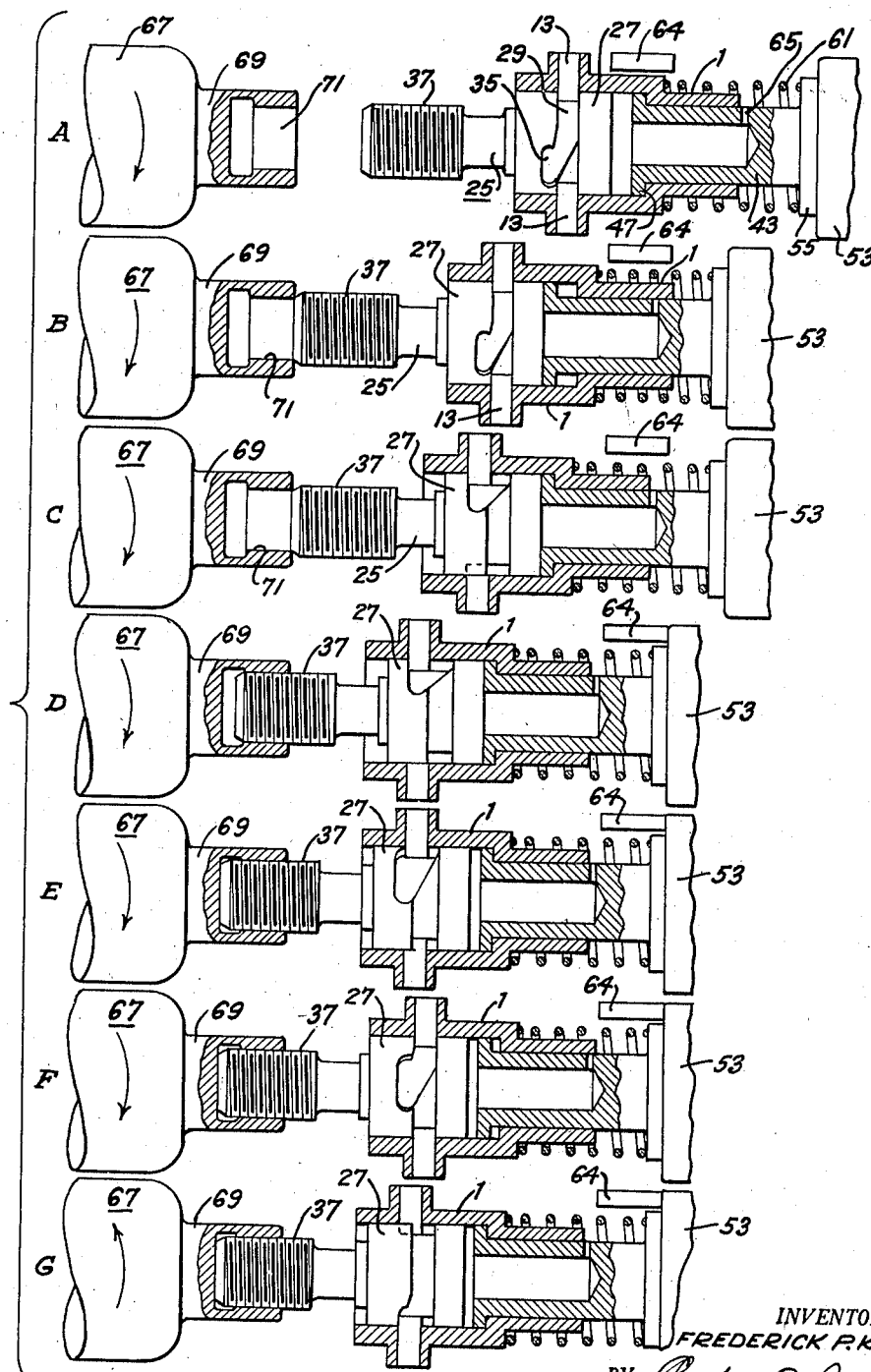

Figures 6A to 6G, inclusive, are comparative views depicting the sequence of steps in the functioning of the improved tap and die holder of my invention.

In general, my invention comprises a housing having a stem portion, and terminating in a cylindrical chamber. This housing is mounted with its stem portion in slidable engagement on a hollow spindle which terminates in a piston within the cylindrical chamber portion of the housing. The stem of the housing is splined to the spindle to preclude rotation of the housing on the spindle, while permitting slidable movement of the housing thereon.

A rotatable tool assembly is carried within the cylindrical chamber of the housing, and is freely rotatable therein, until the tool is brought into contact with the work to be operated on, at which time the tool assembly will respond to the frictional driving engagement of the work and cause it to become locked against further rotation in the cylindrical chamber. The work supplies the motive power, and following the locking of the tool assembly against rotation, the continued rotation of the work will enable the tool to perform its function. The parts are designed to provide air cushion, shock absorption between the moving components of the tap and die holder, and particularly between the piston and the tool assembly, whereby smooth and shockless operation will be realized. Following the complete operation, the tool is withdrawn from the work, merely through reversing the direction of rotation of the work, and, as in the previous operations, the work provides the motive power for this disengaging operation.

For a more detailed description of the invention, reference will be made to the aforementioned drawings.

The tap and die holder comprises a housing 1 having a hollow stem portion 3, and terminating in an open-ended cylindrical chamber 5 having a liner 7 on its inner cylindrical surface. The housing is formed with an annular rib 9 surrounding the cylindrical chamber portion of the housing. This rib has a pair of diametrically positioned openings therethrough to receive a pair of bearings 11 in which are slidably supported a pair of pins 13. Around the annular rib is a trough-shaped ring cap 15, having diametrically positioned solid sections 17 in contact with the rib to receive setscrews 19 for holding the cap to the rib. Each of these solid sections also has riveted thereto a leaf spring 21 extending circumferentially within the cap 15, with its free end 23 in engagement against one of the pins 13, urging the same inwardly into the chamber.

The housing 1 carries within its chamber a tool assembly 25 including a cam element 27 of cylindrical shape, snugly fitting within the liner 7. This cam element is formed with a cam groove 29 peripherally about its midsection, this cam groove comprising a pair of spiral cam surfaces 31, each extending to the beginning of the other, at which location it follows a lateral spiral path 33 to effect connection with an offset peripheral slot 35 of uniform depth, having a pin engaging end 36 and a pin engaging end 38. A sloping guide shoulder 40 is thereby developed at the junctions of the two spiral cam surfaces, The height of each peripheral slot 35 is less than the diameter of a pin 13, the significance of which will be pointed out in describing the operation of the tap and die holder.

The tool, a tap 37, for example, is mounted in the cam element 27 by inserting the same into an axial opening therethrough and securing the tool therein by means of a setscrew 39 which terminates flush with the cylindrical surface of the cam element. The cam element is also provided with a pair of grooves 41 connecting the cam groove 29 and the internal end of the cam element, the depth of such groove increasing from the cam groove toward the internal end surface of the element. These grooves 41 are located intermediate the peripheral slots 35 in the cam surface pattern, and permit of the insertion of the cam element into the housing chamber, by providing passage for the pins during such insertion and guiding the same to the cam groove 29 of the cam element.

The housing is mounted on a spindle 43 having longitudinal splines 45 thereon engaging the inner wall of the hollow stem 3 of the housing to preclude rotation of the housing on the spindle, while permitting sliding of the housing thereon.

The spindle at one end extends into the chamber 5 terminating therein in a piston 47 engaging the smooth inner wall of the liner 7, and provided with a circumferential oil seal groove 49 in the edge thereof. At its other end, the spindle has a reduced section 51 which is further reduced at its end and threaded.

The tap and die holder is mounted in the turret 53 of a lathe or other machine in which it is to be used, by bolting the spindle 43 to a mounting plate 55 which in turn may be bolted to the turret of the machine. The spindle is keyed in the mounting plate to preclude rotation thereof during use. The mounting plate is formed with a threaded end 57 of reduced section, to accommodate a protective sleeve 59 which encloses the spindle 43 and the spindle-engaging portion of the housing 1. A spring 61 mounted in compression between the threaded end 57 of the mounting plate 55 and a shoulder 63 on the housing, tends to urge the housing to its maximum forward position on the spindle.

The entire tap and die holder assembly, as above described, is adapted to be moved in accordance with the permissible movement of the turret 53. The extent of such movement is determined by a stop element 64 which may be mounted to any fixed portion of the machine.

In addition to the structural components thus far described, my invention contemplates additional structural details and relationships between the components to provide for shock absorption in the operation of the mechanism. With this in mind, the spindle is of hollow construction and has a release port 65 through the wall thereof. This release port is so located that, with the housing 1 at its foremost position on the spindle 43, the port will be exposed exteriorly of the spindle and approximately adjacent the stem end of the housing.

To thoroughly understand the operation of my improved tap and die holder and the manner in which the various components cooperate to provide the advantages and fulfill the objects of my invention, it will be necessary to analyze the operation thereof in terms of the various stages through which the apparatus passes, as when accomplishing a complete tapping operation. I have, accordingly, in Figures 6A to 6G inclusive, depicted by comparative figures the various stages passed through in the operation of my improved tap and die holder.

Figure 6A depicts the mechanism and the relationship of component parts when mounted in the turret of a lathe, for example, in position to be moved into engagement with the work to be operated on. In the drawings, the work is illustrated as comprising a cylindrical element 67 having a reduced end section 69 with a hole 71 therein to be tapped. The work is mounted on a rotatable spindle of any conventional form (not shown), and is set in rotation as the turret is manually moved to bring the tap 37 in engagement with the work. As illustrated in Figure 6A, the housing 1 is at its foremost position on the spindle 43, under the action of the spring 61, in which position it engages the piston head 47 and uncovers the release port 65. The tool assembly 25 is rotatably supported within the chamber 5 by the pins 13 which engage the cam groove 29, the permissible direction of rotation of the assembly being the same as the direction of rotation of the work, which is indicated by an arrow on the work 67.

The apparatus is now set to be lowered into engagement with the work 67, and at the instant of engagement as depicted in Figure 6B, the shock, which would normally occur upon contact of the tap 37 and work, is thoroughly absorbed by the cushioning effect provided for in the tap and die holder. It will be noted by reference to this figure that, at the instant of contact, the cam element 27 and housing 1 are halted as a unit, in their movement, while the turret 53 and spindle 43 are free to continue until the piston 47 abuts against the cam element 27. During such movement of the spindle, however, the release port 65 is covered by the stem portion 3 of the housing before the piston abuts the cam element, and for the remainder of movement of the spindle, the air in the hollow portion of the spindle and between the piston and the cam element is subject to compression, thus bringing about absorption of the shock which would ordinarily occur when two metals are brought into contact with one another. The shock absorbing ability of the air chamber formed by the spindle in cooperation with the cam element, is aided somewhat by the fact that during such continued movement of the spindle, compression of the spring 61 will also occur.

The following operating stage of the mechanism, as depicted in Figure 6C, occurs immediately or practically simultaneously with the movements described in connection with Figure 6B. The frictional engagement between the tap 37 and the rotating work 67 will cause the rotational movement of the work to be transmitted to the tap, and in as much as the tap is fixed within the cam element by setscrew 39, the entire tool assembly 25 will start to rotate. The spring 61, being temporarily under compression in Figure 6B, will urge the housing 1 back to its original position in engagement against the piston 47 as in Figure 6A. Such forward thrust of the spring against the housing will cause the pins 13 to slide into the peripheral slots 35, where each pin will engage the end 36 of its associated slot, to lock the tool assembly against further rotation. Continued pressure on the turret urging the assembly against the work, will thereby cause the work to engage the tap, and initiate the actual threading of the work, during which threading operation, the turret is fed toward the work at a rate which will be commensurate with the rate of threading. Such forward movement of the turret will continue until the turret strikes the stop element 64 which is so positioned as to cause engagement by the turret when the tap has almost, but not quite, reached the bottom of the opening 71 in the work. The actual clearance between the bottom of the tap and the bottom of the opening is determined by the height of the peripheral slot 35, and will be discussed in connection with the subsequent Figures 6E and 6F.

When the turret has engaged the stop element 64, no further motion of the turret is possible in the direction of the work. However, tapping does not terminate at this time. The rotational movement of the work will bring about a tendency for the work to thread itself up the tap, but in as much as the work is fixed against all movement, except rotational movement, the tap must necessarily thread further into the work. This it can do to a limited extent determined when the tap reaches the bottom of the hole in the work, during which movement of the tap, the pins 13 will have been partially withdrawn from the peripheral slots 35 which they engage, at the end 36 of each one, although not entirely removed therefrom, thus maintaining the locking engagement between the cam element 27 and the housing 1. This condition is represented in the Figure 6E, and in as much as the cam element has been partially pulled out of engagement with the pins, a spacing will develop between the piston 47 and the cam element 27, as shown.

Since the tap, in the position illustrated in Figure 6E, can move no further in the direction of the work, and the cam element is still locked with respect to the housing, and in as much as the tap 37 and cam element 27 must necessarily begin to rotate with the work under these conditions, it must naturally follow that such rotation of the tool assembly will cause the housing 1 to completely withdraw from locking engagement with the peripheral slots 35, to create a relationship of components as illustrated in Figure 6F, wherein the housing is shown as having been moved slightly in the direction of the turret, creating an air chamber between the housing 1 and the piston 47, and causing compression of the spring 61, with the pins riding in the cam groove 29. At this stage, the tool assembly can rotate freely with the work, and the tapping operation will have been completed. This is the condition illustrated in Figure 6F.

The condition represented in Figure 6F will maintain itself until it is desired to free the tap from the work and restore the entire assembly for a subsequent tapping operation. This separation is realized simply by reversing the direction of rotation of the work, as shown in Figure 6G. When such reverse rotation is inaugurated, the tool assembly will tend to reverse its direction of rotation along with the work, due to the frictional engagement between the tap and the work. However, such rotation of the tool assembly in the reverse direction can only exist for a fraction of one revolution, or until such time as the pins strike the sloping shoulders 40 formed at the junctions of the two spiral cam surfaces, at which instant the pins will be guided into the peripheral slots 35 to engage the opposite ends 38 thereof, and the tool assembly again becomes locked against rotation, though this time against rotation in the reverse direction. Such engagement of the pins in the peripheral slots is somewhat aided by the spring 61 which has been under heavy compression, as shown in the previous figure. When the tool assembly has become locked in the housing, the turret is permitted to move away from the work at a rate which will permit the work to unthread itself from the tap. After complete separation has been effected and the turret removed to its farthest position with respect to the work, the assembly will again be in position for another tapping operation, which requires nothing but the substitution of another piece of work for the work which has just previously been threaded.

From the above description of the operation of my improved tap and die holder, it will be apparent that the same will fulfill all the objects of my invention. The various air chambers formed therein provide shock absorption during operation, and by constructing the cam element in cylindrical form to snugly fit within the chamber of the housing, a very substantial support is given to the tool, and vibrationless operation results therefrom. The apparatus is adapted to tap at high speeds, and by reason of the rugged construction and the support given to the tool, a perfect thread will be realized at each successive operation, irrespective of the speed at which the operation takes place.

The stop element 64 is preferably made adjustable to accommodate the operation of my improved tap and die holder to the threading of holes of different depths, the minimum depth being limited only by the amount of threading necessary to partially withdraw the pins from the peripheral slots to the approximate position indicated in Figure 6E.

Thus, while I have disclosed and described my invention in great detail, it will be apparent that the same may be modified or altered, without departing from the spirit of the invention, and I accordingly do not desire to be limited in my protection to the specific details described and illustrated, except as may be necessitated by the prior art and the appended claims.

I claim:

1. A tap and die holder comprising a housing, a tool assembly rotatably mounted within said housing and means responsive to pressure of rotating work against said tool assembly for locking said tool assembly against rotation, and cushioning means for absorbing the shock when said tool assembly is brought into initial contact with such work.

2. A tap and die holder comprising a housing having a cylindrical chamber therein, a cylindrical tool carrying element fitting within said cylindrical chamber and having a peripheral cam groove of gradually increasing depth therein and terminating in a peripheral slot, a pin supported in the wall of said chamber and extending into said cam groove, and spring means for maintaining said pin in pressure contact with the cam surface of said groove, said cam groove causing said pin to be guided into said peripheral slot upon rotation of said cylindrical tool carrying element in one direction to lock said tool carrying element against further rotation in the same direction.

3. A tap and die holder comprising a cylindrical housing having an open end, a tool assembly mounted within the open end of said housing and slidable therein between one position permitting free rotation of said tool assembly in one direction, and another position locking said assembly against rotation in said direction, means responsive to pressure of rotating work against said tool assembly for urging said tool assembly from a position of free rotation to a position locking said assembly against rotation, and cushioning means for absorbing the shock when said tool assembly is brought into initial contact with such work.

4. A tap and die holder comprising a housing having a cylindrical chamber therein, a piston extending into one end of said cylindrical chamber, said housing being slidable on said piston, a cylindrical tool carrying element fitting within the opposite end of said cylindrical chamber and forming with said piston, a shock cushioning chamber, said tool carrying element having a peripheral cam groove of gradually increasing depth therein and terminating in a peripheral slot, a pin supported in the wall of said chamber and spring means for maintaining said pin in pressure contact with the cam surface of said groove, said cam groove causing said pin to be guided into said peripheral slot upon rotation of said cylindrical tool carrying element, to lock said tool carrying element against further rotation in the same direction.

5. A tap and die holder comprising a housing, means for restraining said housing against rotational movement, a tool assembly rotatably mounted within said housing and cam means responsive to pressure of rotating work against said tool assembly for locking said tool assembly to said housing.

6. A tap and die holder comprising a housing, a tool assembly rotatably mounted within said housing and means responsive to pressure of rotating work against said tool assembly for locking said tool assembly against rotation in said housing, and air cushioning means for absorbing the shock when said tool assembly is brought into initial contact with such work.

7. A tap and die holder comprising a housing having a cylindrical chamber therein, a cylindrical tool carrying element fitting within said cylindrical chamber and having a peripheral cam groove of gradually increasing depth therein defining in part a lateral spiral path toward the exposed end of said tool carrying element and terminating in a peripheral slot, a pin supported in the wall of said chamber and extending into said cam groove, and spring means for maintaining said pin in pressure contact with the cam surface of said groove, said cam groove causing said pin to be guided into said peripheral slot upon rotation of said cylindrical tool carrying element in one direction to lock said tool carrying element against further rotation in the same direction.

8. A tap and die holder comprising a housing, a tool assembly including a work threading tool rotatably mounted within said housing, cam means responsive to pressure of rotating work against said work threading tool for locking said tool assembly against rotation and initiate a threading operation during continuance of such work pressure, and means for determining the maximum period of permissible pressure contact between said tool and such rotating work, said cam means, upon termination of such pressure, restoring said tool assembly to its rotatably mounted position in response to continued rotation of such work.

9. A tap and die holder comprising a housing having a cylindrical chamber therein, a hollow spindle extending into one end of said cylindrical chamber and terminating in a piston therein, said housing being slidable on said spindle, a cylindrical tool carrying element fitting within the opposite end of said cylindrical chamber and forming with said hollow spindle and piston, a shock cushioning chamber, said tool carrying element having a spiral peripheral cam groove of gradually increasing depth therein and terminating in a peripheral slot, a pin supported in the wall of said chamber and spring means for maintaining said pin in pressure contact with the cam surface of said groove, said cam groove causing said pin to be guided into said peripheral slot upon rotation of said cylindrical tool carrying element in one direction, to lock said tool carrying element against further rotation in the same direction.

10. A tap and die holder comprising a housing having a cylindrical chamber therein, a hollow spindle extending into one end of said cylindrical chamber and terminating in a piston therein, said housing being slidable on said spindle, a cylindrical tool carrying element fitting within the opposite end of said cylindrical chamber and forming with said hollow spindle and piston, a shock cushioning chamber, and a pressure release port in said spindle interconnecting said shock cushioning chamber with the atmosphere and adapted to be covered by said housing within the slidable limits of said housing on said spindle.

11. A tap and die holder comprising a housing having a cylindrical chamber therein, a hollow spindle of diameter less than said cylindrical chamber, extending into one end thereof and terminating in a piston therein having an oil groove in the peripheral edge thereof, said housing being slidable on said spindle, and restrained against rotation thereon, a cylindrical tool carrying element fitting within the opposite end of said cylindrical chamber and forming with said hollow spindle and piston, a shock cushioning chamber, said tool carrying element having a spiral peripheral cam groove of gradually increasing depth therein and terminating in a peripheral slot, a pin supported in the wall of said chamber, spring means for maintaining said pin in pressure contact with the cam surface of said groove, said cam groove causing said pin to be guided into said peripheral slot upon rotation of said cylindrical tool carrying element in one direction, to lock said tool carrying element against further rotation in the same direction, and a pressure release port in said spindle interconnecting said shock cushioning chamber with the atmosphere and adapted to be covered by said housing within the slidable limits of said housing on said spindle.

12. A tap and die holder comprising a housing, means for restraining said housing against rotational movement, a tool assembly mounted within said housing and normally capable of angular movement about the tool axis thereof, said tool assembly including blocking means actuable upon contact of said assembly with rotating work to lock said tool assembly to said housing to preclude further angular movement of said tool assembly during the work process.

FREDERICK P. KRUSE.